United States Patent
Ishii

(10) Patent No.: US 8,702,243 B2
(45) Date of Patent: Apr. 22, 2014

(54) IMAGE PROJECTION APPARATUS AND INTERCHANGEABLE LENS THEREFOR

(75) Inventor: Atsushi Ishii, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 305 days.

(21) Appl. No.: 13/114,288

(22) Filed: May 24, 2011

(65) Prior Publication Data

US 2011/0292351 A1 Dec. 1, 2011

(30) Foreign Application Priority Data

May 31, 2010 (JP) ................. 2010-124516

(51) Int. Cl.
| | |
|---|---|
| G03B 21/14 | (2006.01) |
| G03B 3/00 | (2006.01) |
| G02B 3/00 | (2006.01) |
| G02B 9/00 | (2006.01) |
| G02B 15/02 | (2006.01) |
| G03B 21/00 | (2006.01) |

(52) U.S. Cl.
USPC ............ 353/69; 353/100; 353/101; 359/649; 359/672

(58) Field of Classification Search
USPC ............... 353/31, 69–70, 94, 100–102, 122; 359/649, 672–675
See application file for complete search history.

(56) References Cited

U.S. PATENT DOCUMENTS

| | | | | |
|---|---|---|---|---|
| 6,592,228 B1 * | 7/2003 | Kawashima et al. | ......... | 353/101 |
| 6,956,702 B2 * | 10/2005 | Pate | ............................. | 359/634 |
| 7,783,128 B2 * | 8/2010 | Kurata et al. | ................. | 382/275 |
| 7,896,505 B2 * | 3/2011 | Shirasu et al. | .................. | 353/85 |
| 7,901,087 B2 * | 3/2011 | Shirasu et al. | .................. | 353/85 |
| 7,903,963 B2 * | 3/2011 | Une et al. | ...................... | 396/310 |

(Continued)

FOREIGN PATENT DOCUMENTS

| | | |
|---|---|---|
| JP | 04-042679 A | 2/1992 |
| JP | 2002-051279 A | 2/2002 |

(Continued)

OTHER PUBLICATIONS

Japanese Office Action for corresponding JP 2010-124516, mail date Dec. 17, 2013.

*Primary Examiner* — Tony Ko
*Assistant Examiner* — Jori S Reilly-Diakun
(74) *Attorney, Agent, or Firm* — Rossi, Kimms & McDowell, LLP

(57) ABSTRACT

The image projection apparatus includes a light modulating element modulating light according to an image signal, a correcting part performing correction processing on the image signal to decrease geometric distortion in a projection image by using correction data, a memory storing first correction data corresponding to interchangeable optical units, and a controller acquiring identification information of the interchangeable optical unit attached to the apparatus, reading the first correction data corresponding to the acquired identification information from the memory, and setting the read first correction data as the correction data for the correction processing. The controller acquires, when no first correction data corresponding to the acquired identification information is stored in the memory, second correction data stored in a memory in the attached interchangeable optical unit, and sets the acquired second correction data as the correction data for the correction processing.

5 Claims, 6 Drawing Sheets

(56) References Cited

U.S. PATENT DOCUMENTS

| | | | |
|---|---|---|---|
| 7,950,807 B2* | 5/2011 | Shirasu et al. | 353/85 |
| 7,993,015 B2* | 8/2011 | Shirasu et al. | 353/85 |
| 8,016,433 B2* | 9/2011 | Shirasu et al. | 353/85 |
| 2003/0048374 A1* | 3/2003 | Minakuti et al. | 348/360 |
| 2006/0087622 A1* | 4/2006 | Brown | 353/57 |
| 2011/0096301 A1* | 4/2011 | Koyama | 353/88 |
| 2012/0218527 A1* | 8/2012 | Hatakeyama et al. | 353/101 |
| 2012/0218528 A1* | 8/2012 | Kano | 353/101 |

FOREIGN PATENT DOCUMENTS

| | | |
|---|---|---|
| JP | 2005-121941 A | 5/2005 |
| JP | 2005-301317 A | 10/2005 |
| JP | 2010-087729 A | 4/2010 |
| JP | 2011-193337 A | 9/2011 |

* cited by examiner

IMAGE PROJECTION APPARATUS AND INTERCHANGEABLE LENS THEREFOR

BACKGROUND OF THE INVENTION

1. Field of the Invention

The present invention relates to an image projection apparatus, particularly to an image projection apparatus whose projection optical system is interchangeable.

2. Description of the Related Art

Image projection apparatuses project light modulated by a light modulating element (also called as an image-forming element) such as a liquid crystal panel through a projection optical system onto a projection surface such as a screen to display a projection image. In order to display the projection image in a user's desiring region, it is necessary to adjust projection conditions such as an orientation (direction) and an oblique angle (inclination) of the image projection apparatus. However, changing the projection conditions causes in the projection image geometric distortion such as trapezoidal (keystone) distortion.

Japanese Patent Laid-Open No. 04-42679 discloses an image projection apparatus that detects an installation angle of the apparatus and performs geometric distortion correction on the basis of the detected installation angle to display on a screen a projection image including no distortion. Japanese Patent Laid-Open No. 2005-301317 discloses an image projection apparatus that performs image processing (sharpness adjustment) in response to change of an optical characteristic of its projection optical system with interchange thereof.

However, the image projection apparatus disclosed in Japanese Patent Laid-Open No. 04-42679 does not consider that an optical characteristic of its projection optical system is changed with interchange thereof. Therefore, inadequate geometric distortion correction may be made for the interchanged projection optical system, which may make it impossible to display a projection image including no distortion.

Moreover, the image projection apparatus disclosed in Japanese Patent Laid-Open No. 2005-301317 only performs the sharpness adjustment in response to the change of the optical characteristic with the interchange of the projection optical system, but does not perform geometric distortion correction.

SUMMARY OF THE INVENTION

The present invention provides an image projection apparatus capable of performing adequate geometric distortion correction in response to interchange of its projection optical system, and an interchangeable optical unit therefor.

The present invention provides as an aspect thereof an image projection apparatus configured to project light through a projection optical system onto a projection surface to display a projection image and configured such that one of plural interchangeable optical units respectively including the projection optical systems that are mutually different is selectively attached. The apparatus includes a light modulating element configured to modulate the light to be projected through the projection optical system according to an image signal, a correcting part configured to perform correction processing on the image signal to decrease geometric distortion that appears in the projection image by using correction data, a correction data memory configured to store first correction data corresponding to the respective interchangeable optical units, and a controller configured to acquire identification information of the interchangeable optical unit attached to the image projection apparatus among the plural interchangeable optical units, to read the first correction data corresponding to the acquired identification information from the correction data memory, and to set the read first correction data as the correction data to be used in the correction processing. The controller is configured to acquire, when no first correction data corresponding to the acquired identification information is stored in the correction data memory, second correction data stored in a memory provided in the interchangeable optical unit attached to the image projection apparatus, and to set the acquired second correction data as the correction data to be used in the correction processing.

The present invention provides as another aspect thereof an image projection apparatus configured to project light through a projection optical system onto a projection surface to display a projection image and configured such that one of plural interchangeable optical units respectively including the projection optical systems that are mutually different is selectively attached. The apparatus includes a light modulating element configured to modulate the light to be projected through the projection optical system according to an image signal, a correcting part configured to perform correction processing on the image signal to decrease geometric distortion that appears in the projection image by using correction data, a correction data memory configured to store first correction data corresponding to the respective interchangeable optical units, and a controller configured to acquire identification information of the interchangeable optical unit attached to the image projection apparatus among the plural interchangeable optical units, to read the first correction data corresponding to the acquired identification information from the correction data memory, and to set the read first correction data as the correction data to be used in the correction processing. The controller is configured to acquire, when no first correction data corresponding to the acquired identification information is stored in the correction data memory, optical information of the interchangeable optical unit attached to the image projection apparatus, to calculate second correction data, and to set the second correction data as the correction data to be used in the correction processing.

The present invention provides as still another aspect thereof an image projection apparatus configured to project light through a projection optical system onto a projection surface to display a projection image and configured such that one of plural interchangeable optical units respectively including the projection optical systems that are mutually different is selectively attached. The apparatus includes a light modulating element configured to modulate the light to be projected through the projection optical system according to an image signal, a correcting part configured to perform correction processing on the image signal to decrease geometric distortion that appears in the projection image by using correction data, a correction data memory configured to store correction data corresponding to optical information of the respective interchangeable optical units, and a controller configured to acquire the optical information of the interchangeable optical unit attached to the image projection apparatus among the plural interchangeable optical units, to read the stored correction data corresponding to the acquired optical information from the correction data memory, and to set the read correction data as the correction data to be used in the correction processing.

The present invention provides as yet still another aspect thereof an interchangeable optical unit including a projection optical system and configured to be detachably attached to an image projection apparatus. The image projection apparatus includes a light modulating element configured to modulate, according to an image signal, light to be projected through the projection optical system to display a projection image, a correcting part configured to perform correction processing on the image signal to decrease geometric distortion that appears in the projection image by using correction data, and a controller configured to set the correction data. The interchangeable optical unit includes a correction data memory configured to store the correction data corresponding to the interchangeable optical unit and being readable by the controller.

Further features of the present invention will become apparent from the following description of exemplary embodiments (with reference to the attached drawings).

DESCRIPTION OF THE EMBODIMENTS

Exemplary embodiments of the present invention will hereinafter be described with reference to the accompanying drawings.

[Embodiment 1]

Figure 1:
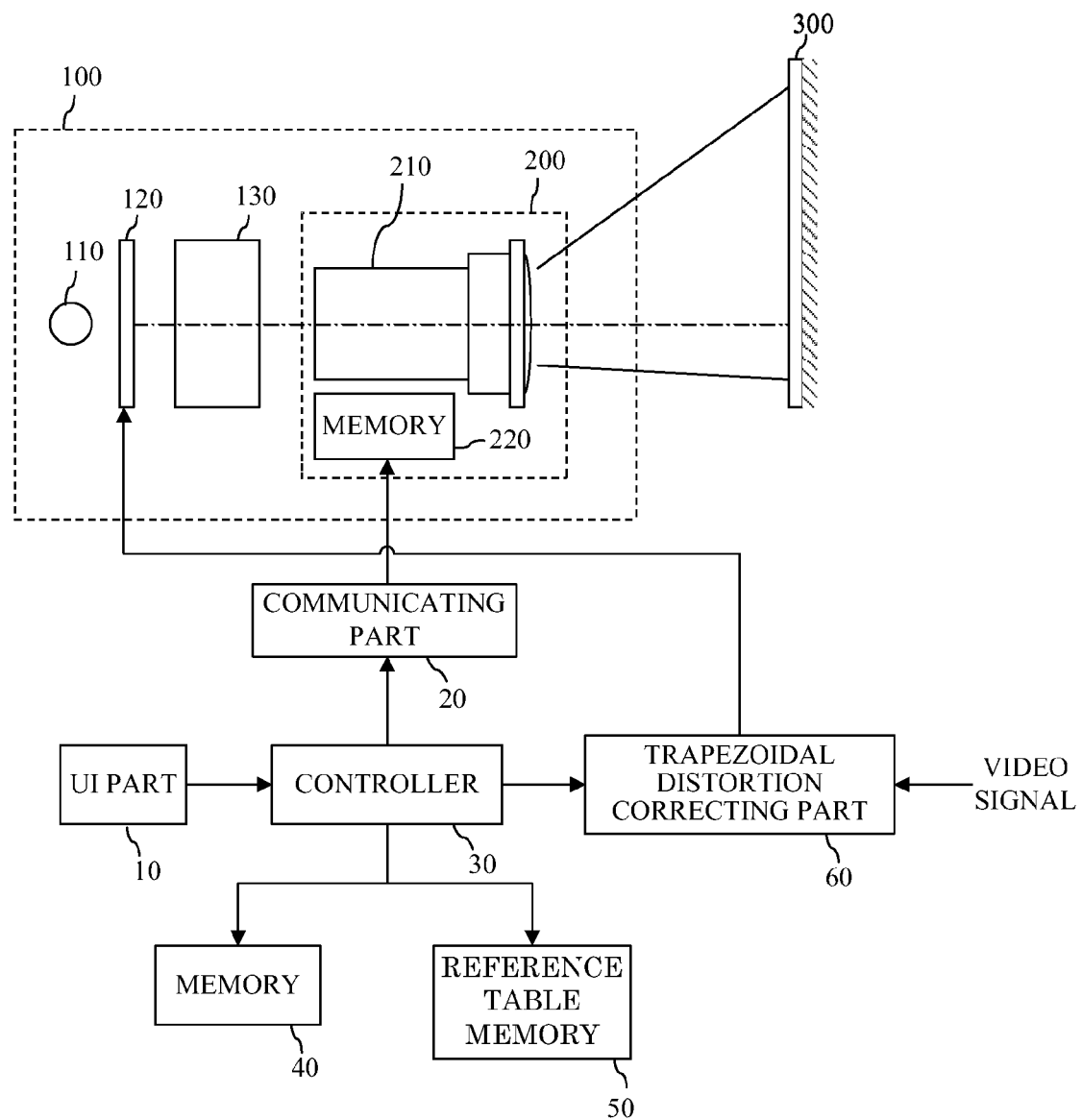
FIG. 1 is a block diagram showing the configuration of a projector that is Embodiment 1 of the present invention.

FIG. 1 shows the configuration of a projector 100 as an image projection apparatus that is a first embodiment (Embodiment 1) of the present invention. In the projector 100, light from a light source 110 is modulated by a light modulating element 120 such as a liquid crystal panel and a DMD (digital micromirror device).

The light modulating element 120 is driven according to a video signal (image signal) input from an outside of the projector 100 to modulate the light entering thereinto.

The light modulated by the light modulating element 120 is projected onto a projection surface 300 through a projection optical system 210 provided in an interchangeable projection lens 200 as an interchangeable optical unit. The interchangeable projection lens (hereinafter simply referred to as a "projection lens") 200 is detachably attached to a lens mount 130 provided in the projector 100. Thus, a projection image (projected image) is displayed on the projection surface 300.

The projection lens 200 is provided with the above-described projection optical system 210 and a memory 220 as a projection lens side correction data memory. The memory 220 stores a correction parameter (second correction data) to be used for trapezoidal distortion correction (keystone correction) as geometric distortion correction performed by a trapezoidal distortion correcting part 60 provided in the projector 100 when the projection lens 200 is attached to the projector 100. The correction parameter is a parameter unique (specific) to this projection lens 200 (that is, the projection optical system 210), in other words, a parameter corresponding to this projection lens 200.

To the projector 100, one of plural projection lenses whose projection optical systems are different from each other in configuration and optical characteristic can be selectively attached. These plural projection lenses attachable to the projector 100 include not only a projection lens provided with the memory 220 storing the correction parameter like the projection lens 200, but also a projection lens not provided with the memory 220.

Moreover, the memory 220 also stores identification information that is information unique to this projection lens 200 to be used for identifying this projection lens 200, such as a name (model number or serial number) thereof, and information on optical characteristics (hereinafter referred to as "optical information") of the projection optical system of this projection lens 200. The optical information includes an angle of view, an optical axis shift amount, a lens distortion (aberration) amount and the like. The optical axis shift amount is a shift amount of an optical axis of the projection optical system with respect to a center of the light modulating element 120.

The correction parameter, the identification information and the optical information (these identification information and optical information are hereinafter collectively referred to as "lens information") stored in the memory 220 can be acquired (read) by a controller 30 of the projector 100 through a communicating part 20.

In the projector 100, the video signal (image signal) from the outside of the projector 100 is input to the trapezoidal distortion correcting part 60. The trapezoidal distortion correcting part 60 performs trapezoidal distortion correction for decreasing trapezoidal distortion that appears in the projection image, on the basis of the correction parameter set by the controller 30 and information on an oblique angle of the projector 100 with respect to the projection surface 300. The trapezoidal distortion correction is correction processing relating to drive of the light modulating element 120. Specifically, the trapezoidal distortion correction performs geometric correction (geometric transformation) that provides, to the input video signal, a reverse trapezoidal distortion to cancel out the trapezoidal distortion appearing in the projection image. Then, the trapezoidal distortion correcting part 60 produces a driving signal for driving the light modulating element 120 according to the image signal after the trapezoidal distortion correction.

The correction parameter to be used for the trapezoidal distortion correction includes, for example, data defining a positional relationship of corresponding points in the image signals before and after the trapezoidal distortion correction for each oblique angle of the projector 100, and a conversion expression and coefficients thereof to be used in trapezoidal distortion correction calculation performed on the input image signal. Such a correction parameter is different depending on the optical characteristic of the projection optical system 210, and is, as described above, unique to the projection lens 200.

The communicating part 20 communicates with the memory 220 in response to a lens information acquisition demand received from the controller 30 to read the lens information from the memory 220 and send it to the controller 30.

A memory 40 that is a projector side correction data memory also stores correction parameters (first correction data) to be used for the trapezoidal distortion correction in the trapezoidal distortion correcting part 60 as well as the memory 220. However, the memory 40 stores plural correction parameters respectively corresponding to plural projection lenses that are attachable to the projector 100.

A reference table memory 50 stores reference table data for providing correspondence between the identification information of one of the plural projection lenses attachable to the projector 100 and one of the correction parameters stored in the memory 40. The reference table data is, for example, data showing a position (address) in the memory 40 where the correction parameter corresponding to the identification information is stored.

The controller 30 sets, in response to input of the information on the oblique angle of the projector 100 with respect to the projection surface 300 through a use's operation at a UI (user interface) part 10, the input oblique angle as an oblique angle to be used in the trapezoidal distortion correcting part 60.

Moreover, the controller 30 acquires the identification information from the projection lens actually attached to the projector (hereinafter also referred to as an "attached projection lens") 100. Then, the controller 30 reads, when the correction parameter corresponding to the acquired identification information is stored in the memory 40, that corresponding correction parameter to set it as the correction parameter to be used in the trapezoidal distortion correcting part 60. On the other hand, when no correction parameter corresponding to the acquired identification information of the attached projection lens is stored in the memory 40, but the correction parameter is stored in the memory 220, the controller 30 reads the correction parameter from the memory 220 through the communicating part 20. Then, the controller 30 sets the read correction parameter as the correction parameter to be used in the trapezoidal distortion correcting part 60. Thus, even when the projection optical system is interchanged, it is possible to perform adequate geometric distortion correction processing.

Figure 2:
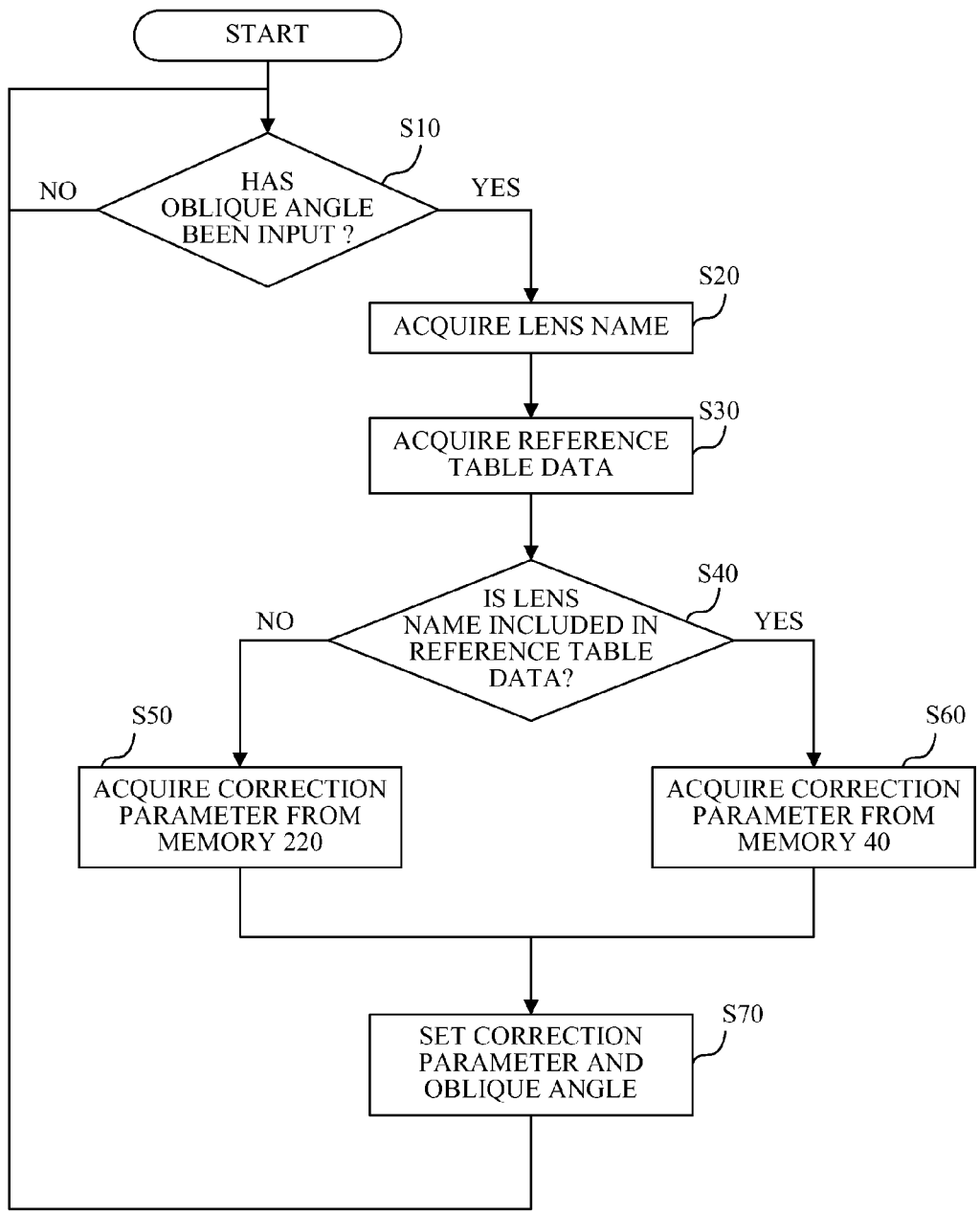
FIG. 2 is a flowchart showing processing performed in the projector of Embodiment 1.

FIG. 2 is a flowchart showing processing (operation) performed by the controller 30 for setting the correction parameter used in the trapezoidal distortion correcting part 60. The controller 30 performs the processing according to a computer program.

After start of the processing, at step S10, the controller 30 determines whether or not the information on the oblique angle of the projector 100 with respect to the projection surface 300 has been input from the UI part 10. The controller 30 repeats this step if the information on the oblique angle has not been input, and proceeds to step S20 if the information on the oblique angle has been input.

At step S20, the controller 30 sends the lens information acquisition demand to the communicating part 20, and acquires the identification information (written as "lens name" in the figure) of the attached projection lens 200. Then, the controller 30 proceeds to step S30.

At step 30, the controller 30 acquires the reference table data stored in the reference table memory 50, and then proceeds to step S40.

At step S40, the controller 30 determines whether or not the reference table data acquired at step S30 includes identification information identical to the identification information of the attached projection lens 200 acquired at step S20. The controller 30 proceeds to step S50 if the reference table data does not include the identical identification information, and proceeds to step S60 if the reference table data includes the identical identification information.

At step S50, the controller 30 sends the lens information acquisition demand to the communicating part 20, and acquires the correction parameter from the memory 220 of the attached projection lens 200. Then, the controller 30 proceeds to step S70.

On the other hand, at step S60, the controller 30 acquires, from the reference table data, the data of the address of the correction parameter corresponding to the identification information of the attached projection lens 200 in the memory 40. In addition, the controller 30 reads the correction parameter stored at the acquired address from the memory 40, and then proceeds to step S70.

At step S70, the controller 30 sets the correction parameter acquired at step S50 or S60 and the oblique angle input from the UI part 10 at step S10 to the trapezoidal distortion correcting part 60. After the setting, the controller 30 returns to step S10.

Next, description will be made of adequate trapezoidal distortion correction and inadequate trapezoidal distortion correction performed when the projection lens is interchanged, with reference to FIGS. 5 and 6.

Figure 5:
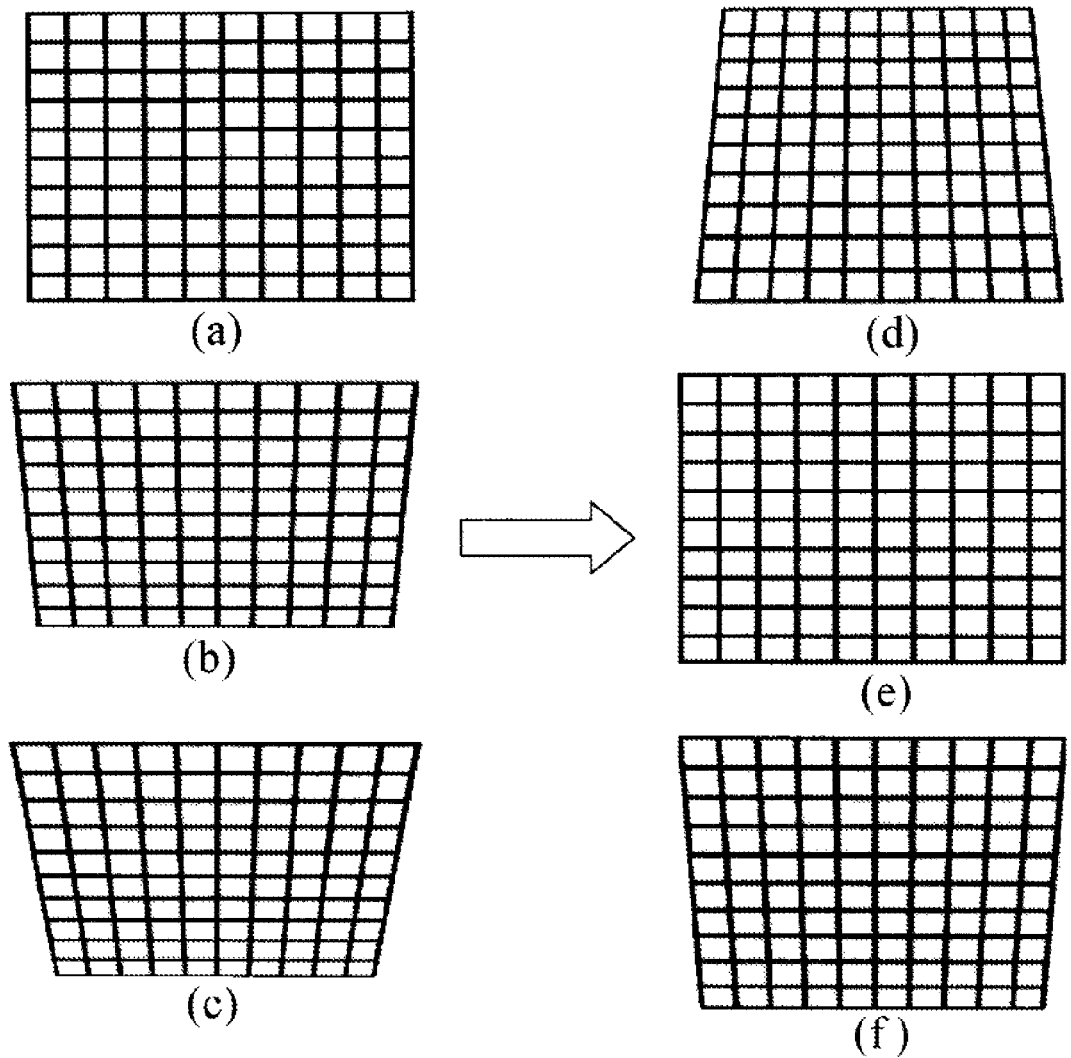
FIG. 5 shows examples of original images and projection images when adequate and inadequate trapezoidal distortion corrections are performed.
Figure 6:
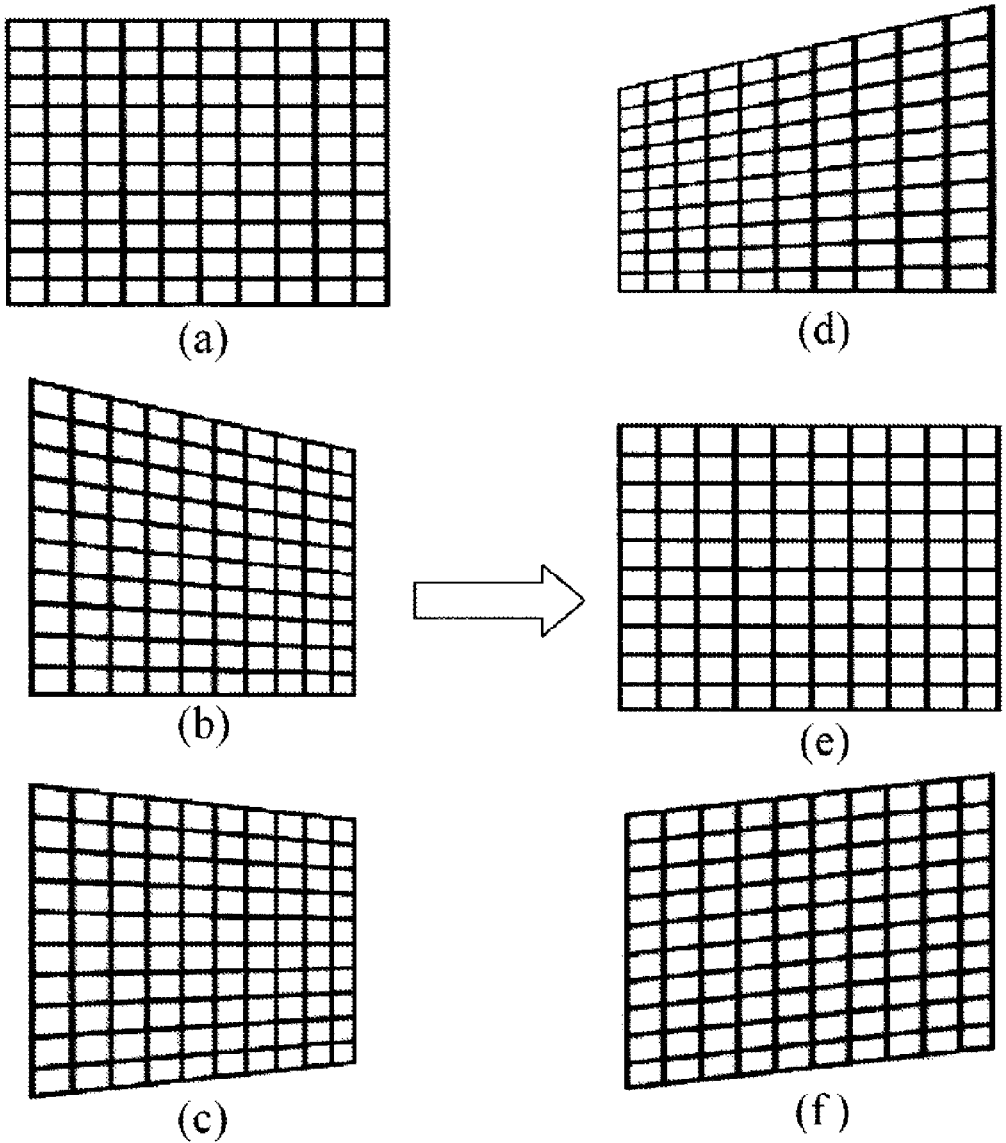
FIG. 6 shows other examples of original images and projection images when adequate and inadequate trapezoidal distortion corrections are performed.

In each of FIGS. 5 and 6, (a) shows an image formed by a video signal (image signal) on which no trapezoidal distortion correction is performed by the trapezoidal distortion correcting part 60. The image formed by the video signal is hereinafter referred to as an "original image". In each of FIGS. 5 and 6, (b) shows an original image resulting from adequate trapezoidal distortion correction performed on the original image shown at (a), and (c) shows an original image resulting from inadequate trapezoidal distortion correction performed on the original image shown at (a).

Moreover, (d) shows a projection image when light modulated according to the original image shown at (a) is projected onto the projection surface in an oblique direction (that is, with an oblique angle) with respect thereto. The projection in the oblique direction (out-of-perpendicular direction) with respect to the projection surface is hereinafter referred to as "oblique projection". In addition, (e) shows a projection image when the oblique projection of light modulated according to the original image shown at (b) is made, and (f) shows a projection image when the oblique projection of light modulated according to the original image shown at (c) is made. At (d) to (f), the oblique angles of the projector with respect to the projection surface are mutually same.

In a state where the projector perpendicularly faces the projection surface, the original image and the projection image are similar in shape to each other. The projection in a perpendicular direction with respect to the projection surface is hereinafter referred to as "perpendicularly facing projection".

The adequate trapezoidal distortion correction means such trapezoidal distortion correction that makes the shape of the projection image in the oblique projection similar to that of the projection image in the perpendicularly facing projection. On the other hand, the inadequate trapezoidal distortion correction means such trapezoidal distortion correction that does not make the shape of the projection image in the oblique projection similar to that of the projection image in the perpendicularly facing projection.

The original image shown at (c) in FIG. 5 is an image resulting from the inadequate trapezoidal distortion correction using the correction parameter corresponding to a projection lens whose focal length is shorter than that of the attached projection lens. In the projection image shown at (f) in FIG. 5 which corresponds to the original image shown at (c) in FIG. 5, the trapezoidal distortion is not sufficiently decreased. The original image shown at (c) in FIG. 6 is an image resulting from the inadequate trapezoidal distortion correction using the correction parameter corresponding to a projection lens whose optical axis shift amount is larger than that of the attached projection lens. Also in the projection image shown at (f) in FIG. 6 which corresponds to the original image shown at (c) in FIG. 6, the trapezoidal distortion is not sufficiently decreased.

Moreover, even if the oblique angle to be used in the trapezoidal distortion correction is intentionally changed, a projection image whose aspect ratio is different from that of the original image is displayed, which means that the adequate trapezoidal distortion correction is not performed.

In contrast thereto, as shown at (b) and (e) in FIG. 5 and at (b) and (e) in FIG. 6, performing the adequate trapezoidal distortion correction using the correction parameter corresponding to the attached projection lens (that is, to the focal length and the optical axis shift amount thereof) enables display of a projection image whose trapezoidal distortion is sufficiently decreased.

Next, description will be made of reasons that the correction parameters are respectively stored in the projection lens side memory 220 and the projector side memory 40 in this embodiment.

In a case of storing the correction parameters in the memory 220 of the projection lens, it is necessary to store the correction parameters corresponding to all models of the projectors to which that projection lens can be attached. This case requires an extremely large storage capacity in the memory 220, which prevents miniaturization and weight reduction of the projection lens and increases cost thereof. Moreover, in a case of storing a large amount of the correction parameters only in the memory 220, the controller 30 may require a long time to read the correction parameter from the memory 220.

From these reasons, in a case where the projector and the projection lens attachable thereto have been already produced, the correction parameter corresponding to the projection lens is stored in the projector side memory 40. On the other hand, in a case where any one of the projector and the projection lens attachable thereto has not been yet produced, the correction parameter corresponding to the projection lens is stored in the projection lens side memory 220 so as to enable use of the stored correction parameter even in such a case.

[Embodiment 2]

Next, description will be made of a projector that is a second embodiment (Embodiment 2) of the present invention. Basic configurations of the projector of this embodiment and an interchangeable projection lens used in this embodiment is same as those in Embodiment 1, and therefore components common to those in Embodiment 1 are denoted by the same reference numerals as those in Embodiment 1. However, in this embodiment, the projection lens side memory 220 stores only the identification information and the optical information of this projection lens, and does not store the correction parameter. Moreover, in this embodiment, processing to set the correction parameter which is performed by the controller 30 is different from that in Embodiment 1.

Figure 3:
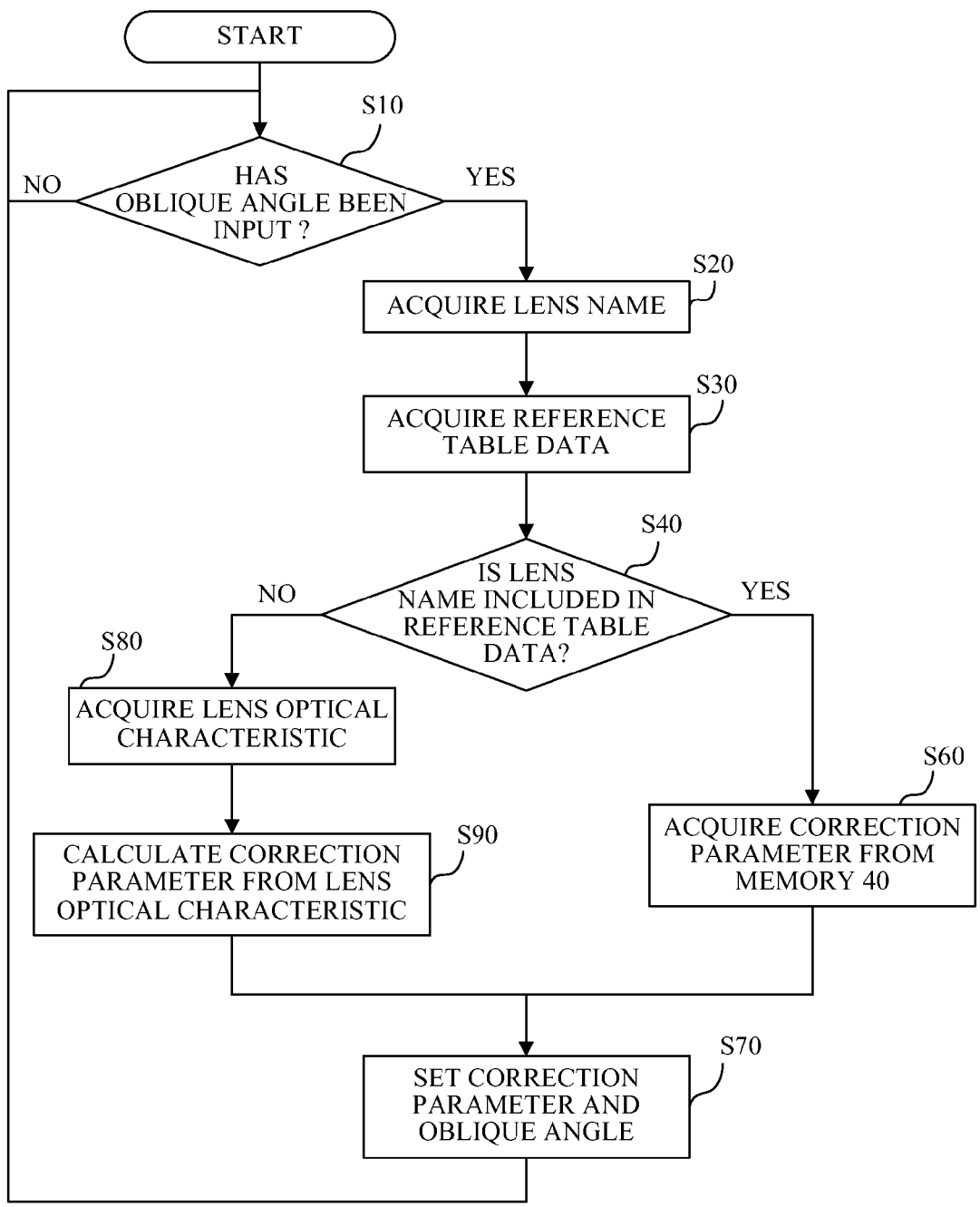
FIG. 3 is a flowchart showing processing performed in a projector that is Embodiment 2 of the present invention.

FIG. 3 is a flowchart showing processing (operation) performed by the controller 30 for setting the correction parameter used in the trapezoidal distortion correcting part 60. The controller 30 performs the processing according to a computer program. Among steps shown in FIG. 3, steps common to those shown in FIG. 2 are denoted by the same step numbers as those in FIG. 2, and their description is omitted. The flowchart shown in FIG. 3 includes steps S80 and S90, instead of step S50 shown in FIG. 2.

The controller 30 that has determined at step S40 that the reference table data includes no identification information identical to the identification information of the attached projection lens 200 sends, at step S80, the lens information acquisition demand to the communicating part 20, and acquires the optical information (written as "lens optical characteristic" in the figure) of the attached projection lens 200 from the memory 220 thereof. Then, the controller 30 proceeds to step S90.

At step S90, the controller 30 calculates a correction parameter (second correction data) on the basis of the optical information acquired at step S80. This process enables acquisition of the correction parameter corresponding to the attached projection lens (that is, to the optical information thereof) even when no correction parameter corresponding to the attached projection lens 200 is stored in both the projector side memory 40 and the projection lens side memory 220. Then, the controller 30 proceeds to step S70.

Next, description will be made of a reason that the correction parameter is calculated from the optical information only when the correction parameter is not stored in the memory 40 in this embodiment.

The calculation of the correction parameter on the basis of the optical information often needs a large calculation amount, which may require a long time. Therefore, from a standpoint of response of the projector, it is preferable to store the correction parameter in the memory 40 as compared to a case of calculating the correction parameter on the basis of the optical information. Thus, this embodiment calculates, only when no correction parameter is stored in the memory 40, the correction parameter on the basis of the optical information.

[Embodiment 3]

Next, description will be made of a projector that is a third embodiment (Embodiment 3) of the present invention. Basic configurations of the projector of this embodiment and an interchangeable projection lens used in this embodiment is same as those in Embodiment 1, and therefore components common to those in Embodiment 1 are denoted by the same reference numerals as those in Embodiment 1.

However, in this embodiment, the projection lens side memory 220 stores only the optical information of this projection lens, and does not store the identification information and the correction parameter. Moreover, in this embodiment, the reference table memory 50 stores reference table data for providing correspondence between the optical information of each of the plural projection lenses attachable to the projector and one of the plural correction parameters stored in the memory 40. The reference table data is, for example, data showing a position (address) in the memory 40 where the correction parameter corresponding to the optical information is stored.

In addition, this embodiment is different from Embodiments 1 and 2 in processing for setting of the correction parameter which is performed by the controller 30.

Figure 4:
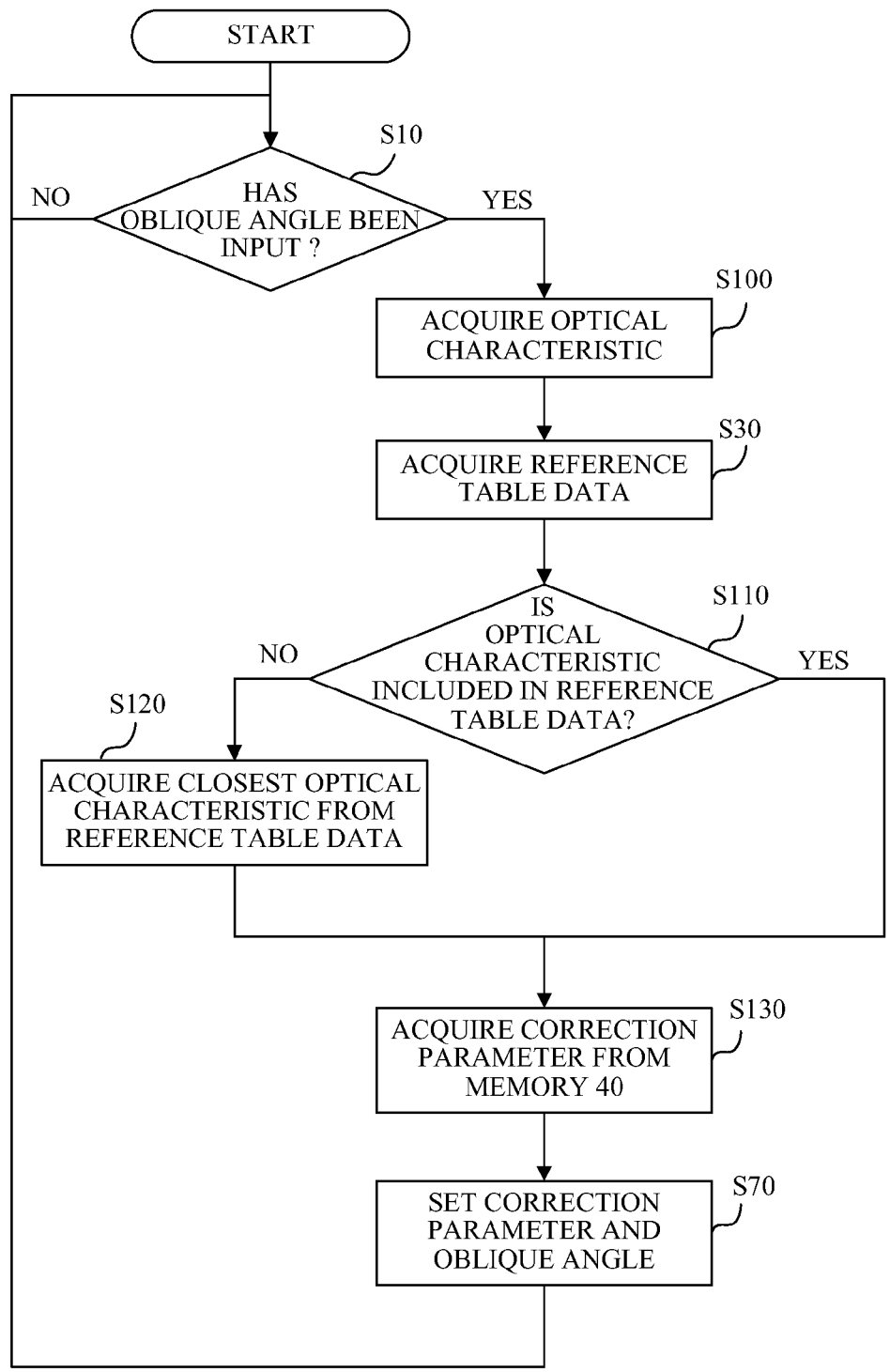
FIG. 4 is a flowchart showing processing performed in a projector that is Embodiment 3 of the present invention.

FIG. 4 is a flowchart showing processing (operation) performed by the controller 30 for setting the correction parameter used in the trapezoidal distortion correcting part 60. The controller 30 performs the processing according to a computer program. Among steps shown in FIG. 4, steps common to those shown in FIG. 2 are denoted by the same step numbers as those in FIG. 2, and their description is omitted.

After step S10, the controller 30 sends, at step S100, the lens information acquisition demand to the communicating part 20, and acquires the optical information (written as "lens optical characteristic" in the figure) of the attached projection lens 200. Then, the controller 30 proceeds to step S30.

The controller 30 that has acquired at step S30 the reference table data from the reference table memory 50 determines, at step S110, whether or not the reference table data includes optical information identical to the optical information of the attached projection lens 200 acquired at step S100.

The controller 30 proceeds to step S120 if the reference table data does not include the optical information, and proceeds to step S130 if the reference table data includes the optical information.

At step S120, the controller 30 selects, of the optical information stored in the reference table data, specific optical information that is closest to the optical information acquired at step 100. Then, the controller 30 replaces the optical information acquired at step S100 by the selected specific optical information, and thereafter proceeds to step S130.

At step S130, the controller 30 acquires, from the reference table data, the data of the address where the correction parameter corresponding to the optical information (including the specific optical information selected at step S120) of the attached projection lens 200 is stored in the memory 40. The correction parameter corresponds to the specific optical information is also referred to as a "specific correction parameter". In addition, the controller 30 reads the correction parameter stored at the acquired address from the memory 40, and then proceeds to step S70.

Although each of the above embodiments described the case where the correction parameter is directly stored in the projection lens side memory 220, information on an address or the like for referring to the correction parameter stored in other memories may be stored in the projection lens side memory 220.

Moreover, although each of the above embodiments described the case where the projector side memory 40 and the projection lens side memory 220 are physically separated from each other, one memory provided in an external computer, a projector or a projection lens may be logically divided.

In addition, although each of the above embodiments described the case where the correction parameter is set to the trapezoidal distortion correcting part 60, the correction parameter set to the trapezoidal distortion correcting part 60 may be information on an address or the like to refer to a memory that stores a substance of the correction parameter.

Furthermore, although each of the above embodiments described the case where the trapezoidal distortion correction is made as the geometric distortion correction, geometric distortion correction other than the trapezoidal distortion correction such as correction of lens distortion (aberration) may be made.

In addition, each of the above embodiments described the case where the correction parameter is set to the trapezoidal distortion correcting part 60 with each change of the oblique angle of the projector with respect to the projection surface. However, the correction parameter may be set only when the projection lens is interchanged, and only the oblique angle may be set to the trapezoidal distortion correcting part 60 when only the oblique angle is changed.

Moreover, although each of the above embodiments described the case where the setting of the correction parameter to the trapezoidal distortion correcting part 60 is performed in response to an input operation at the UI part 10, it may be performed at other timings such as a timing when a predetermined time has elapsed.

Furthermore, although each of the above embodiments described the case where the interchange of the projection lens causes change in focal length and optical axis shift amount, a configuration may be employed which can set a change amount of the focal length or the optical axis shift amount from a reference state to the trapezoidal distortion correcting part 60. In addition, the correction parameter may include data considering change of the focal length or the optical axis shift amount.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-124516, filed on May 31, 2010, which is hereby incorporated by reference herein in its entirety.

What is claimed is:

1. An image projection apparatus configured to project light through a projection optical system onto a projection surface to display a projection image and configured so that one of plural interchangeable optical units each including an optical system is selectively attached, the optical systems of the plural interchangeable optical units being mutually different, the image projection apparatus comprising:
    a light modulating element configured to modulate the light to be projected through the projection optical system according to an image signal;
    a correcting part configured to perform correction processing on the image signal to decrease geometric distortion that appears in the projection image by using correction data;
    a correction data memory configured to store first correction data corresponding to the respective interchangeable optical units; and
    a controller configured to acquire identification information of the interchangeable optical unit attached to the image projection apparatus among the plural interchangeable optical units, to read the first correction data corresponding to the acquired identification information from the correction data memory, and to set the read first correction data as the correction data to be used in the correction processing,
    wherein the controller is configured to acquire, when no first correction data corresponding to the acquired identification information is stored in the correction data memory, second correction data stored in a memory provided in the interchangeable optical unit attached to the image projection apparatus, and to set the acquired second correction data as the correction data to be used in the correction processing.

2. An image projection apparatus configured to project light through a projection optical system onto a projection surface to display a projection image and configured so that one of plural interchangeable optical units each including an optical system is selectively attached, the optical systems of the plural interchangeable optical units being mutually different, the image projection apparatus comprising:
    a light modulating element configured to modulate the light to be projected through the projection optical system according to an image signal;

a correcting part configured to perform correction processing on the image signal to decrease geometric distortion that appears in the projection image by using correction data;

a correction data memory configured to store first correction data corresponding to the respective interchangeable optical units; and a controller configured to acquire identification information of the interchangeable optical unit attached to the image projection apparatus among the plural interchangeable optical units, to read the first correction data corresponding to the acquired identification information from the correction data memory, and to set the read first correction data as the correction data to be used in the correction processing, wherein the controller is configured to acquire, when no first correction data corresponding to the acquired identification information is stored in the correction data memory, optical information of the interchangeable optical unit attached to the image projection apparatus, to calculate second correction data, and to set the second correction data as the correction data to be used in the correction processing.

3. An image projection apparatus configured to project light through a projection optical system onto a projection surface to display a projection image and configured so that one of plural interchangeable optical units each including an optical system is selectively attached, the optical systems of the plural interchangeable optical units being mutually different, the image projection apparatus comprising:

a light modulating element configured to modulate the light to be projected through the projection optical system according to an image signal;

a correcting part configured to perform correction processing on the image signal to decrease geometric distortion that appears in the projection image by using correction data;

a correction data memory configured to store correction data corresponding to optical information of the respective interchangeable optical units; and a controller configured to acquire the optical information of the interchangeable optical unit attached to the image projection apparatus among the plural interchangeable optical units, to read the stored correction data corresponding to the acquired optical information from the correction data memory, and to set the read correction data as the correction data to be used in the correction processing.

4. An image projection apparatus according to claim 3, wherein the controller is configured to select, when no correction data corresponding to the acquired optical information is stored in the correction data memory, specific correction data corresponding to specific optical information that is closest to the acquired optical information of the interchangeable optical unit attached to the image projection apparatus, and to set the specific correction data as the correction data to be used in the correction processing.

5. An interchangeable optical unit including a projection optical system and configured to be detachably attached to an image projection apparatus, the image projection apparatus comprising:

a light modulating element configured to modulate, according to an image signal, light to be projected through the projection optical system to display a projection image;

a correcting part configured to perform correction processing on the image signal to decrease geometric distortion that appears in the projection image by using correction data; and a controller configured to set the correction data, wherein the interchangeable optical unit further comprises:

a correction data memory configured to store the correction data corresponding to the interchangeable optical unit and being readable by the controller.

* * * * *